(12) United States Patent
Robison et al.

(10) Patent No.: US 12,038,094 B2
(45) Date of Patent: Jul. 16, 2024

(54) EXCESS FLOW VALVE WITH INSTALLATION INDICATOR

(71) Applicant: Georg Fischer Central Plastics LLC, Shawnee, OK (US)

(72) Inventors: David L. Robison, Madison, OH (US); Randall L. Schultz, Shawnee, OK (US); Matthew G. Eye, Shawnee, OK (US); Petr Sramek, Moore, OK (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 136 days.

(21) Appl. No.: 17/579,939

(22) Filed: Jan. 20, 2022

(65) Prior Publication Data

US 2023/0228338 A1 Jul. 20, 2023

(51) Int. Cl.
*F16K 17/30* (2006.01)
*F16K 15/02* (2006.01)

(52) U.S. Cl.
CPC ............ *F16K 17/30* (2013.01); *F16K 15/025* (2013.01)

(58) Field of Classification Search
CPC . F16L 37/113; F16L 37/086; Y10T 137/0447; Y10T 137/7856; Y10T 137/9029; Y10T 137/86316; Y10T 137/8225; Y10T 137/8158; Y10T 137/2836; F16K 15/025; F16K 17/30
USPC ........................................................ 137/498
See application file for complete search history.

(56) References Cited

U.S. PATENT DOCUMENTS

| 1,627,312 | A | * | 5/1927 | Blust | E21B 34/08 |
| | | | | | 137/538 |
| 3,872,884 | A | | 3/1975 | Busdiecker et al. | |
| 3,918,481 | A | | 11/1975 | Doe et al. | |
| 4,776,369 | A | * | 10/1988 | Lardner | F16L 33/225 |
| | | | | | 137/515 |
| 4,958,657 | A | * | 9/1990 | Hagan | F16K 17/30 |
| | | | | | 137/513.5 |
| 5,086,844 | A | * | 2/1992 | Mims | F16L 37/62 |
| | | | | | 166/212 |
| 5,465,751 | A | | 11/1995 | Newton | |
| 5,551,476 | A | | 9/1996 | McGinnis | |
| 5,613,518 | A | * | 3/1997 | Rakieski | F16K 17/30 |
| | | | | | 137/513.5 |
| 5,653,257 | A | * | 8/1997 | Johnston | G05D 7/0133 |
| | | | | | 138/46 |
| 5,755,259 | A | | 5/1998 | Schulze et al. | |
| 6,802,491 | B1 | * | 10/2004 | Kelly | F16L 37/144 |
| | | | | | 251/149.6 |
| 6,814,101 | B2 | | 11/2004 | Flauzac | |
| 6,892,756 | B2 | | 5/2005 | Schulze | |
| 7,533,689 | B2 | | 5/2009 | Goble | |
| 2004/0000342 | A1 | * | 1/2004 | Takahashi | F16K 15/025 |
| | | | | | 137/538 |
| 2014/0137960 | A1 | * | 5/2014 | Adams | F16K 31/1221 |
| | | | | | 137/553 |

(Continued)

*Primary Examiner* — Jessica Cahill
(74) *Attorney, Agent, or Firm* — Harness, Dickey & Pierce, P.L.C.

(57) ABSTRACT

A valve assembly that includes a valve housing and a valve body that is configured to be mated with the valve housing. The valve housing includes at least one window that extends through a wall of the valve housing, and the valve body includes at least one prong that is configured to mate with the window when the valve body is mated with the valve housing.

20 Claims, 6 Drawing Sheets

(56) References Cited

U.S. PATENT DOCUMENTS

2014/0261741 A1* 9/2014 Konishi .................. F16L 37/36
                                                    137/15.09
2015/0136408 A1* 5/2015 Wright .................. F16L 37/086
                                                    166/344
2020/0182366 A1* 6/2020 Haynes .................. F16K 17/30

* cited by examiner

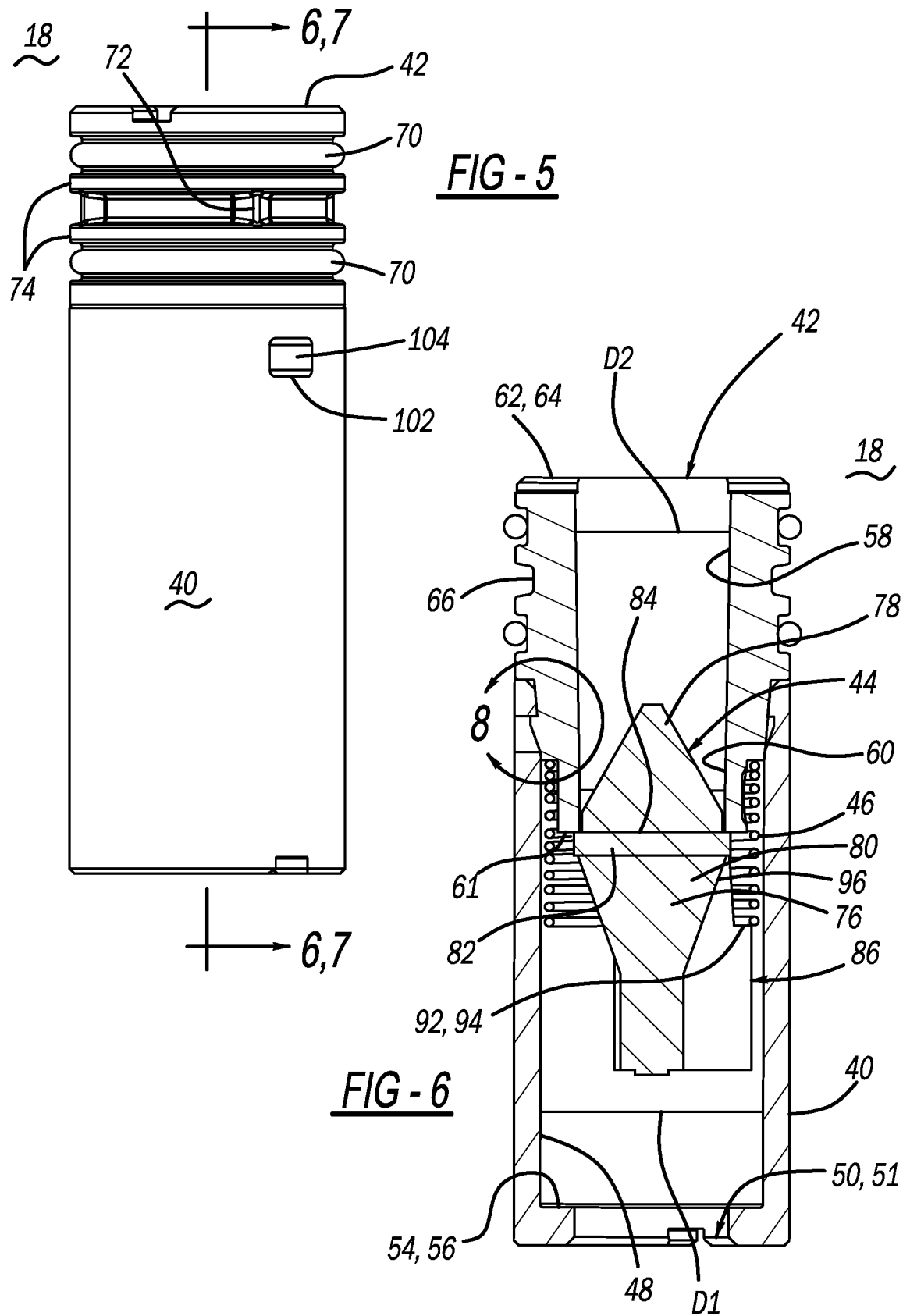

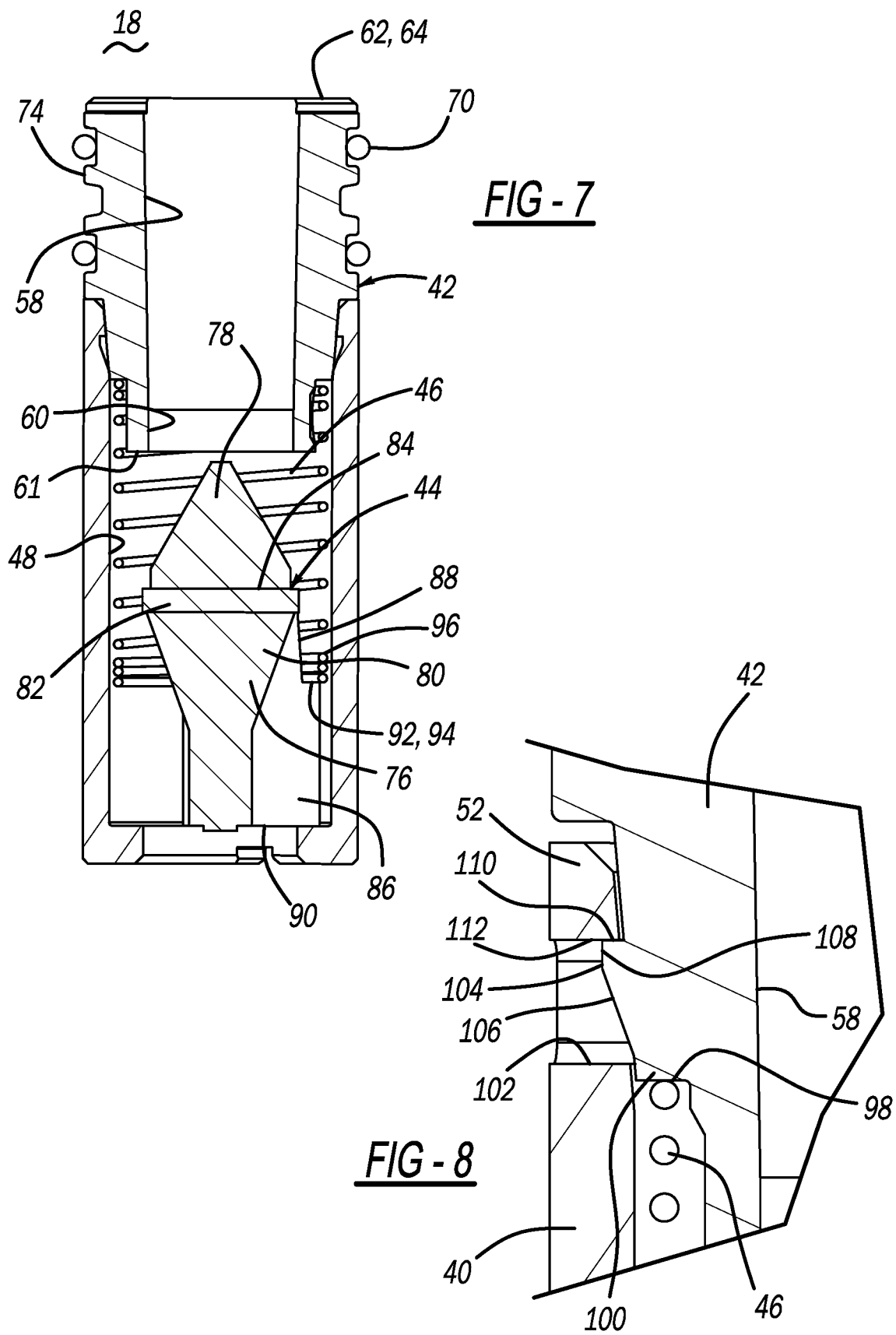

EXCESS FLOW VALVE WITH INSTALLATION INDICATOR

FIELD

The present disclosure relates to an excess flow valve with an installation indicator.

BACKGROUND

This section provides background information related to the present disclosure which is not necessarily prior art.

Flow safety valves are used in the natural gas industry to prevent or at least substantially minimize pipeline gases such as natural gas, propane, methane, coal gas, and the like from escaping when a pipe or conduit carrying the pipeline gas or gases ruptures or experiences a loss of pressure downstream from the flow safety valve. In general, flow safety valves are in an open state during normal use thereof when there is back pressure downstream from the valve. The flow safety valves close when the back pressure downstream disappears, which prevents or at least substantially minimizes the pipeline gases from venting to the atmosphere when the pipe ruptures or experiences pressure loss downstream from the flow safety valve occurs.

Some flow safety valves are permanently assembled structures that can only be disassembled by destroying the valve. While these valves are tamper-proof devices, these valves are generally costly to manufacture and complex to assemble.

Other flow safety valves can be disassembled. Due to orifice restrictions, however, these valves can experience pressure drops across a range of flow rates that can become an issue. In addition, safety valves that can be disassembled can require an increased number of elements such as, for example, snap rings that are used to ensure that the valve member or other interior components remain properly located within the valve assembly. If one of these elements becomes loose or is accidentally omitted during assembly of the flow safety valve, the flow safety valve may not function in the desired manner.

SUMMARY

This section provides a general summary of the disclosure and is not a comprehensive disclosure of its full scope or all of its features.

According to a first aspect, the present disclosure provides a valve assembly that includes a valve housing including a first open end defining a valve inlet, and a second open end; a valve body having a proximate open end configured to be mated with the second open end and defining a valve seat, and a distal open end defining a valve outlet; a movable plunger positioned within the valve housing, the movable plunger defining a valve member that is configured to engage with the valve seat when the valve assembly is closed and be located away from the valve seat when the valve assembly is open; and a spring positioned between the movable plunger and the valve body, the spring being configured to bias the movable plunger toward the valve inlet, wherein the second open end of the valve housing includes at least one window that extends through a wall of the valve housing; and the proximate open end of the valve body includes at least one prong that is configured to mate with the window when the proximate open end is mated with the second open end of the valve housing.

According to the first aspect, the valve body defines a bore, and the at least one prong is wing-shaped and includes a sloped surface that extends away from the bore and terminates at a surface that extends axially and in parallel with bore, and the surface that extends axially and in parallel with the bore terminates at an abutment surface of the prong that extends orthogonally inward toward the bore.

According to the first aspect, an exterior surface of the valve body defines a plurality of ridges configured for receipt of an annular sealing member.

According to the first aspect, a support structure is provided between adjacent ridges.

According to the first aspect, the first open end of the valve housing includes a radially inwardly extending shoulder that defines a surface that is configured to support the plunger when the valve assembly is open.

According to the first aspect, the plunger includes a body having a conically-shaped first section and a conically-shaped second section, and the valve member that extends radially outward from body at a location between the first section and the second section.

According to the first aspect, the plunger includes plurality of spaced apart radially outwardly extending fins that extend outward from the second section of the body.

According to the first aspect, each of the fins includes a first terminal end attached to the body at a location proximate the valve member and a second terminal end that is configured to seat against the surface of the valve housing.

According to the first aspect, a notch is located between the first terminal end and the second terminal end that is configured as a first spring seat for a first end of the spring.

According to the first aspect, the valve body at the open proximate end includes an annular shoulder that extends outward from the open proximate end at a location downstream from the valve seat that defines a second spring seat for a second end of the spring.

According to a second aspect of the present disclosure, there is provided a valve assembly that includes a cylindrical valve housing including a first open end defining a valve inlet and a second open end, the cylindrical valve housing defining a first bore; a cylindrical valve body having a proximate open end configured to be mated with the second open end and defining a valve seat, and a distal open end defining a valve outlet, the cylindrical valve body defining a second bore having a diameter that is less than the first bore; a movable plunger positioned within the valve housing, the movable plunger defining a valve member that is configured to engage with the valve seat when the valve assembly is closed and be located away from the valve seat when the valve assembly is open; and a spring positioned between the movable plunger and the valve body, the spring being configured to bias the movable plunger toward the valve inlet, wherein the second open end of the valve housing includes at least one window that extends through a wall of the valve housing; and the proximate open end of the valve body includes at least one prong that is configured to mate with the window when the proximate open end is mated with the second open end of the valve housing.

According to the second aspect, the at least one prong is wing-shaped and includes a sloped surface that extends away from the second bore and terminates at a surface that extends axially and in parallel with second bore, and the surface that extends axially and in parallel with the second bore terminates at an abutment surface of the prong that extends orthogonally inward toward the second bore.

According to the second aspect, an exterior surface of the valve body defines a plurality of ridges configured for receipt of an annular sealing member.

According to the second aspect, a support structure is provided between adjacent ridges.

According to the second aspect, the first open end of the valve housing includes a radially inwardly extending shoulder that defines a surface that is configured to support the plunger when the valve assembly is open.

According to the second aspect, the plunger includes a body having a conically-shaped first section and a conically-shaped second section, and the valve member that extends radially outward from body at a location between the first section and the second section.

According to the second aspect, the plunger includes plurality of spaced apart radially outwardly extending fins that extend outward from the second section of the body.

According to the second aspect, each of the fins includes a first terminal end attached to the body at a location proximate the valve member and a second terminal end that is configured to seat against the surface of the valve housing.

According to the second aspect, a notch is located between the first terminal end and the second terminal end that is configured as a first spring seat for a first end of the spring.

According to the second aspect, the valve body at the open proximate end includes an annular shoulder that extends outward from the open proximate end at a location downstream from the valve seat that defines a second spring seat for a second end of the spring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 5 is a side perspective view of the excess flow valve in an assembled state;

FIG. 6 is a cross-sectional view of the excess flow valve in a closed state;

FIG. 7 is a cross-sectional view of the excess flow valve in an open state; and

FIG. 8 is an enlarged cross-sectional view of a portion of the excess flow valve illustrated in FIG. 6 that illustrates a connection between a valve housing and a valve body of the excess flow valve.

Corresponding reference numerals indicate corresponding parts throughout the several views of the drawings.

DETAILED DESCRIPTION

Figure 1:
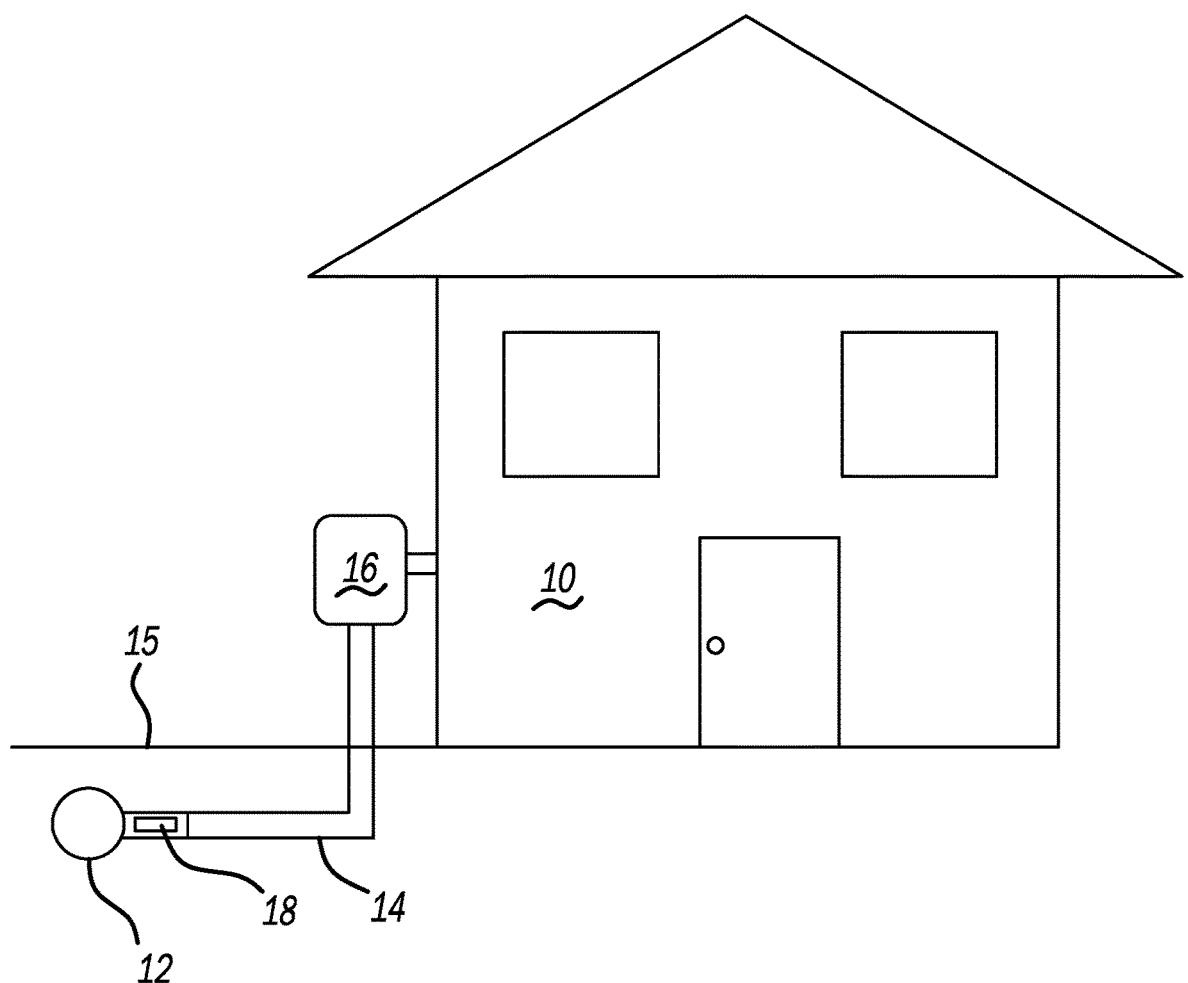
FIG. 1 is a perspective view of a structure that is configured to receive a flow of natural gas from an inlet pipeline that is connected to a main pipeline.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a structure 10 that is connected to a main pipeline 12 that carries a fluid. Main pipeline 12 is connected to structure 10 by an inlet pipeline 14. Main pipeline 12 and inlet pipeline 14 are typically buried beneath the surface of the ground 15 and the fluid carried by main pipeline 12 and inlet pipeline may be, for example, natural gas, propane, water, or any other type of fluid. Alternatively, in lieu of main pipeline 12, the fluid (e.g., propane) may be stored in a storage tank (not shown) that is connected to the structure 10 by inlet pipeline 14. Regardless, the fluid in main pipeline 12 and inlet pipeline 14 is generally pressurized to a pressure greater than ten psi and less than one hundred twenty-five psi. Before reaching structure 10, the fluid may pass through a meter 16 that reduces the pressure to a pressure (e.g., about 2 psi) that is more manageable within the structure 10. Structure 10 may be a dwelling, place of business, or some other type of structure, without limitation.

Figure 2:
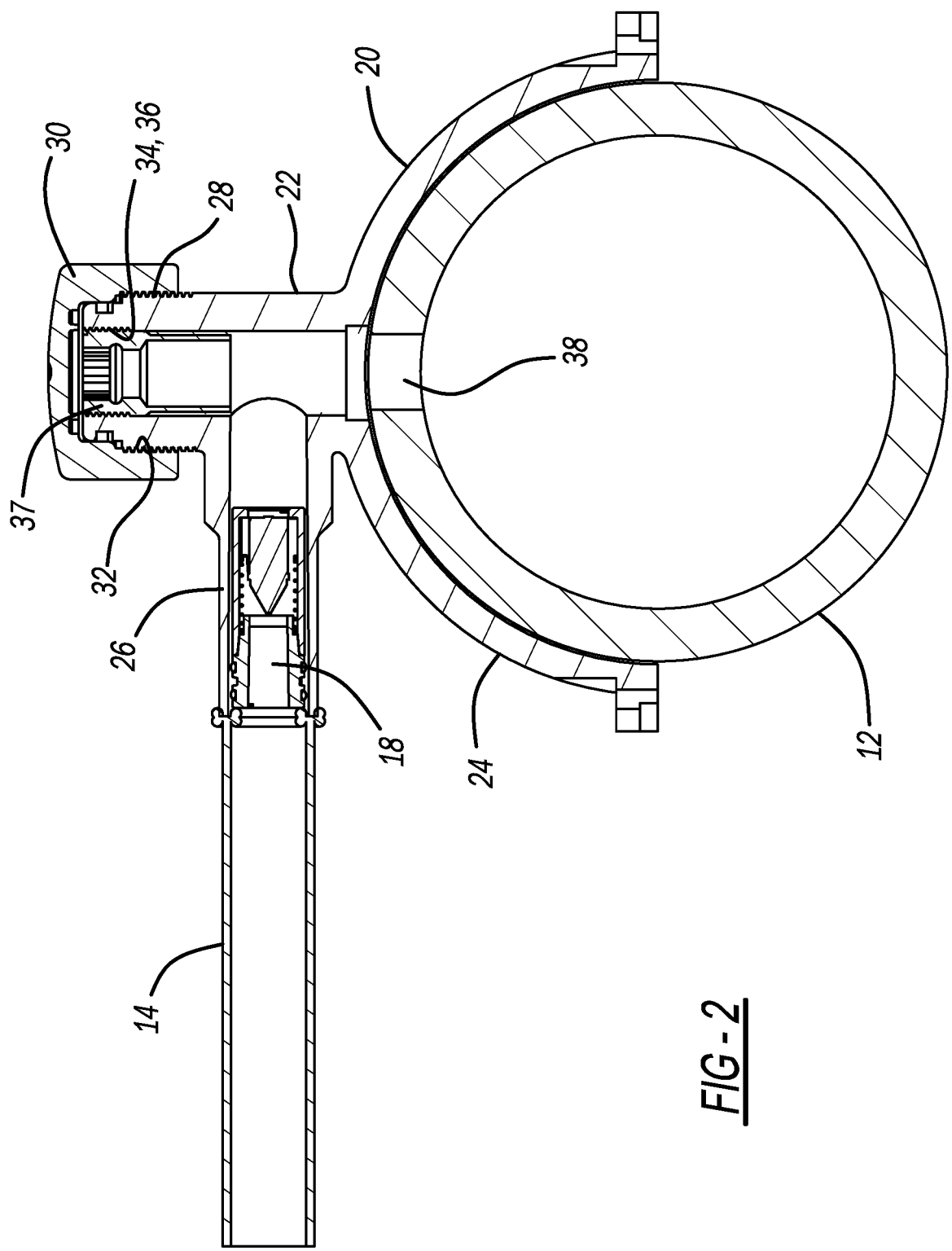
FIG. 2 is a cross-sectional view of an example connection between the inlet pipeline and the main pipeline illustrated in FIG. 1, where a joint between the inlet pipeline and the main pipeline includes an excess flow valve assembly according to a principle of the present disclosure.
Figure 3:
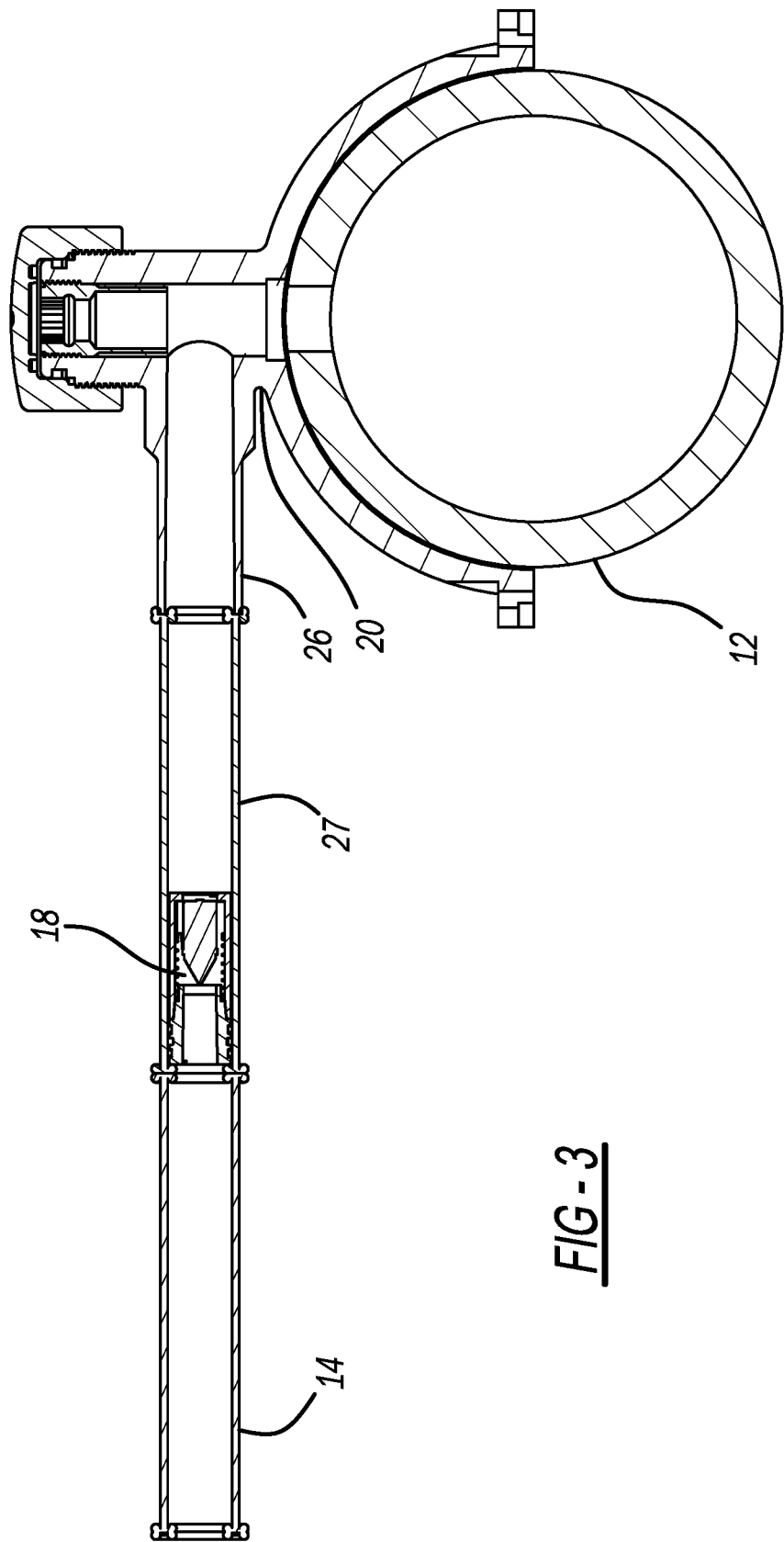
FIG. 3 is a cross-sectional view of another example connection between the inlet pipeline and the main pipeline illustrated in FIG. 1, where the inlet pipeline includes an excess flow valve assembly according to a principle of the present disclosure.

As noted above, the fluid carried by main pipeline 12 and inlet pipeline 14 is at a greater pressure than that located downstream from meter 16. Thus, it is common, and in some instances now required, that an excess flow valve assembly 18 be positioned within the inlet pipeline 14, as shown in FIG. 1 and as best shown in FIGS. 2 and 3. During operation, valve assembly 18 is biased to be in an open position due to the backpressure provided by meter 16, and as will be described in more detail later. In the event of a rupture or pressure drop in inlet pipeline 14 downstream from valve assembly 18, however, the backpressure provided by meter 16 may lower to an extent that causes the valve assembly 18 to close to prevent or at least substantially minimize the fluid from escaping inlet pipeline 14 past the valve assembly 18. Thus, the valve assembly 18 is designed to effectively operate as a safety mechanism that prevents or at least substantially minimize the fluid carried by main pipeline 12 and inlet pipeline 14 from escaping the inlet pipeline 14. This can be particularly advantageous when the fluid is a flammable gas such as natural gas or propane, or when the fluid is water.

Now referring to FIG. 2, it can be seen that main pipeline 12 is connected to inlet pipeline 14 by a joint 20. Main pipeline 12, inlet pipeline 14, and joint 20 may each be formed of a rigid metal material such as steel or iron. It should be understood, however, that other materials are contemplated so long as the material can withstand the pressure generated by the fluid in each of these components, and the material is resistant to puncture and/or rupture. Joint 20 includes a shell 22 having a flared end 24 that is coupled to main pipeline 12 by welding, brazing, or mechanical coupling. Joint 20 also includes an arm 26 that extends orthogonally outward from shell 22 that houses valve assembly 18. Inlet pipeline 14 is coupled to arm 26 downstream from valve assembly 18. Joint 20 may also include an externally threaded end 28 that is configured to be attached to a cap 30 having a threaded surface 32 configured to mate with threaded end 28. An interior surface 34 of joint 20 may also be threaded at 36 such that threaded end 28 can receive an optional insert 37. As illustrated, main pipeline 12 includes an opening 38 that permits fluid carried therein to leave main pipeline 12 and enter joint 20 before passing through valve assembly 18 and into inlet pipeline 14.

It should be understood that valve assembly 18 does not necessarily need to be located in arm 26 of joint 20. In contrast, valve assembly 18 can be located in a pipe coupling 27 that is positioned between arm 26 and inlet pipeline 14 as shown in FIG. 3. Coupling 27 may be attached at one end to arm 26 by welding, brazing, or some other type of attachment method (e.g., mechanically), and attached at the other end to inlet pipeline 14 in the same manner (i.e., by welding, brazing, or some other type of mechanical attachment). Another alternative is that pipe coupling 27 is omitted and valve assembly 18 is located in inlet pipeline 14 downstream from arm 26 of joint 20.

Figure 4:
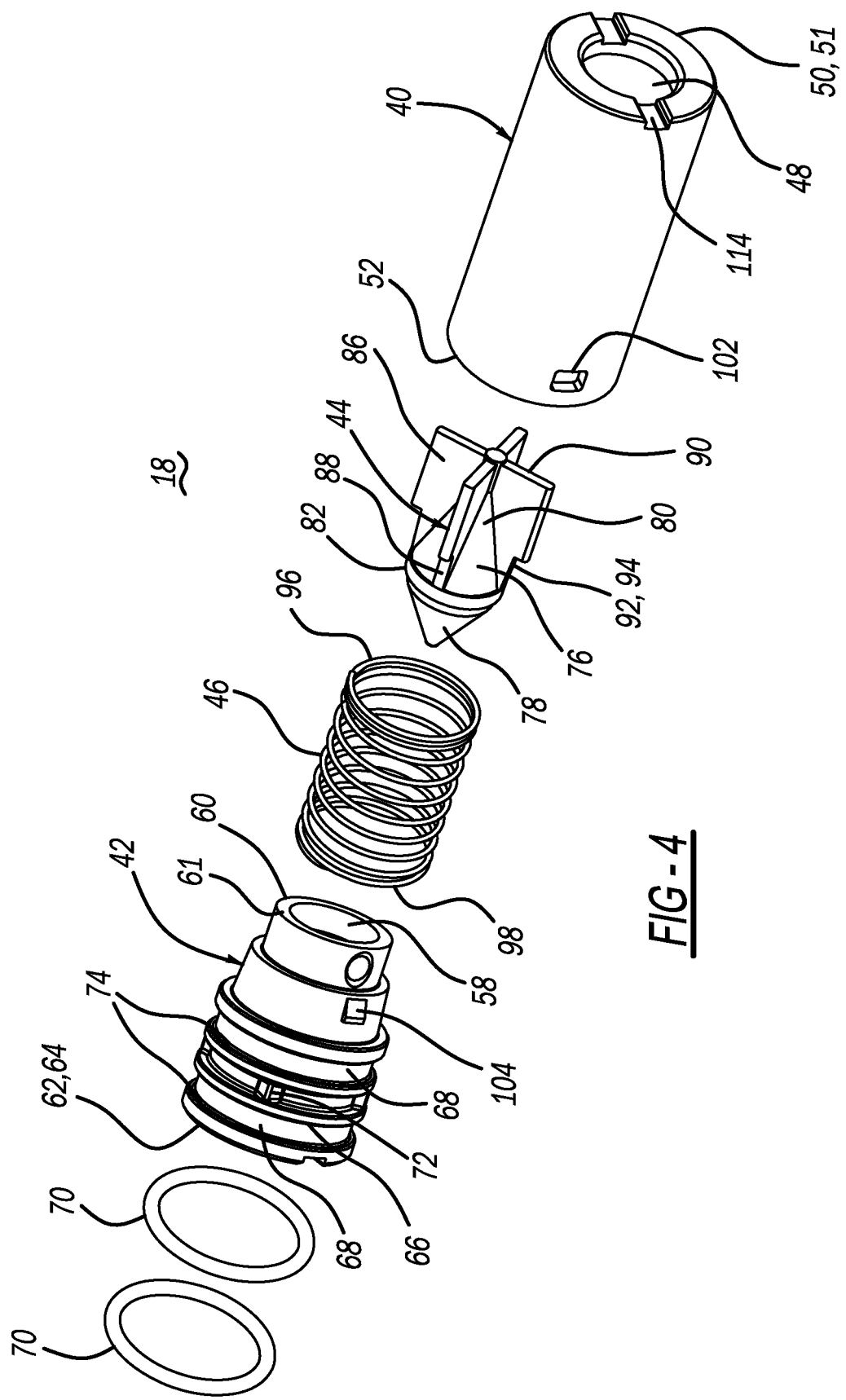
FIG. 4 is an exploded perspective view of the excess flow valve assembly illustrated in FIGS. 2 and 3.

Now referring to FIGS. 4-8, valve assembly 18 will be described. As best shown in FIG. 4, valve assembly 18 generally includes a valve housing 40 that is configured to be removably attached to a valve body 42, a plunger 44, and a spring 46. Valve housing 40 is a cylindrical member that defines a first axially extending bore 48. Valve housing 40 includes a first open end 50 that defines a valve inlet 51 and an opposing second open end 52, where second open end 52 is configured to mate with valve body 42. First open end 50 includes a radially inwardly extending annular shoulder 54 defining a surface 56 that is configured to support plunger 44 when valve assembly 18 is in the open position (FIG. 7). Valve housing 40 may be formed of a rigid material such as a metal (e.g., brass, steel, and the like) or a polymeric material. An example polymeric material is an acetal material. It should be understood, however, that other materials are contemplated so long as the material is substantially rigid that will not degrade when exposed to the fluid that passes through the valve assembly 18.

Valve body 42 is a cylindrical member that defines a second axially extending bore 58. In the illustrated embodiment, an inner diameter D2 of second axially extending bore 58 is less than an inner diameter D1 of the first axially extending bore 48. Due to the second axially extending bore 58 having a diameter D2 that is less than D1 of the first axially extending bore 48, a resistance to the valve assembly 18 closing is created during sudden temporary pressure drops that may occur downstream from the valve assembly 18. Valve body 42 includes a proximate open end 60 that is configured to mate with second open end 52 of value housing 40, and that defines a valve seat 61. A distal open end 62 of valve body 42 defines a valve outlet 64. An exterior surface 66 of distal open end 62 defines a plurality of grooves 68 that are configured for receipt of a respective sealing member 70, which may be a rubber or polymeric o-ring. A plurality of support members 72 can be positioned between the grooves 68 to provide axial support therebetween. In addition, support members 72 permit a thickness of the circumferential walls 74 that define each groove 68 to be less than what would occur without the support members 72. Valve body 42 may be formed of a rigid material such as a metal (e.g., brass, steel, and the like) or a polymeric material. An example polymeric material is an acetal material.

Plunger 44 includes a body 76 having a conically-shaped first section 78 and a conically-shaped second section 80. First and second sections 78 and 80 are designed to smooth a flow of the fluid as it passes over the body 76 when valve assembly 18 is in the open position (FIG. 7). An annular valve member 82 that extends radially outward from body 76 is located between first section 78 and second section 80.

An annular surface 84 of valve member 82 that faces valve seat 61 is configured to engage with valve seat 61 when valve assembly 18 is in the closed position (FIG. 6).

A plurality of spaced apart radially outwardly extending fins 86 extend outward from second section 80 of body 76. Fins 86 are spaced apart to permit fluid to flow therebetween when valve assembly 18 is in the open position (FIG. 7). Fins 86 include a first terminal end 88 attached to body 76 at a location proximate valve member 82, and a second terminal end 90 that is configured to seat against surface 56 of valve housing 40. A notch 92 is located between first terminal end 88 and second terminal end 90 such that a distance that first terminal end 88 extends radially outward from body 76 is less than a distance at which second terminal end 90 extends radially outward from body 76. Notch 92 operates as a first spring seat 94 for a first end 96 of spring 46. Plunger 44 may be formed of a rigid material such as a metal (e.g., brass, steel, and the like) or a polymeric material. An example polymeric material is an acetal material.

As noted above, spring 46 includes a first end 96 configured to seat against first spring seat 94 of plunger 44. A second end 98 is configured to seat against a second spring seat 100, which is best shown in FIG. 8. Second spring seat 100 is an annular shoulder formed in valve body 42. When spring 46 is disposed between first spring seat 94 and second spring seat 100, spring 46 is configured to bias plunger 44 to the open position of valve assembly 18 (FIG. 7). When back pressure down stream from valve assembly 18 is removed, the force of fluid acting on plunger 44 is sufficient to compress spring 46 and enable valve member 82 to engage valve seat 61 and close the valve assembly (FIG. 6). Thus, spring 46 has a spring constant sufficient to bias plunger 44 to the open position during normal operation of valve assembly 18 (i.e., backpressure downstream from valve assembly 18 is greater than fluid pressure located upstream from valve assembly 18).

In accordance with the present disclosure, valve assembly 18 is a device that can be assembled, and subsequently disassembled without having to destroy the valve assembly 18. In order to disassemble valve assembly 18 without destroying valve assembly 18, it should be understood that valve housing 40 and valve body 42 are configured to be easily attached and reattached. More particularly, as best shown in FIGS. 4-8, valve housing 40 includes an aperture or window 102 formed at a location proximate second open end 52 thereof. Window 102 is configured to mate with a radially outwardly extending prong 104 formed at proximate end 60 of valve body 42. While a pair of windows 102 and prongs 104 are illustrated in FIGS. 6 and 7, it should be understood that a greater or lesser number thereof can be used without departing from the scope of the present disclosure.

In the illustrated embodiment, windows 102 are illustrated as being substantially square- or rectangular-shaped. The present disclosure should not be limited thereto and additional shapes such as round, oval, triangular, or any other shape are contemplated. Similarly, while prongs 104 are substantially wing-shaped having a sloped surface 106 that extends away from bore 58 and terminates at a surface 108 that extends axially and in parallel with bore 58, it should be understood that other configurations for prongs 104 are contemplated. In this regard, the primary aspect to keep in mind is that prongs 104 require an abutment surface 110 that is configured to engage with a corresponding abutment surface 112 of window 102. Once abutment surface 110 is mated with abutment surface 112, valve housing 40 cannot be removed from valve body 42 unless prongs 104 are depressed inwardly to disengage prongs 104 from windows 102 and valve member 42 is pulled away from valve housing 40, or vice versa.

To assemble valve assembly 18, valve housing 40 is placed upon a jig (not shown) with second open end 52 facing upward. To ensure that valve housing 40 mates with jig, first open end 50 may include a pair of slots 114 (see FIG. 4) configured to mate with jig and prevent valve housing 40 from moving during assembly of valve assembly 18. After valve housing 40 is located upon jig (not shown), plunger 44 may be placed within valve housing 40. After plunger 44 is located in valve housing 40, spring 46 is then be placed in valve housing 40 such that first end 96 contacts notches 92 of plunger 44. Then, valve body 42 is inserted into first open end 52 of valve housing 40 while taking care to ensure that second end 98 contacts second spring seat 100 of valve body 42. As valve body 42 is further inserted into valve housing 40, prongs 104 shall be aligned with windows 102 so that prongs 104 will mate with windows 102. After abutment surface 110 is mated with abutment surface 102, valve body 42 is prevented from being disengaged from valve housing 40 until prongs 104 are compressed inward by a person's fingers (if valve body 42 and prongs 104 are formed of a polymeric material) or by using a tool if valve body 42 and prongs 104 are formed of a more rigid material such as a metal material.

During operation of valve assembly 18, as noted above, plunger 44 including valve member 82 is biased away from valve seat 61 by spring 46 (FIG. 7) such that valve assembly 18 is open during normal operation thereof. This is because the fluid pressure downstream from valve assembly 18 is greater than the pressure of the fluid that is entering valve assembly 18 at inlet 51.

In the event that the fluid pressure downstream from valve assembly 18 decreases to an extent that is less than the pressure of the fluid that is entering valve assembly 18 at inlet 51 (i.e., in an instance that inlet pipeline 14 ruptures downstream from valve assembly 18 or meter 16 fails), the pressure of the fluid entering valve assembly 18 at inlet 51 will be greater than the force exerted by spring 46, which will force plunger 44 and valve member 82 towards and into contact with valve seat 61 to close the valve assembly 18 (FIG. 6). When valve is closed, the fluid from main pipeline 12 will be prevented or least be substantially minimized from passing through valve assembly 18, which in turn prevents or least substantially minimizes the fluid from escaping at the location of the rupture or other reason for the decreased pressure downstream from the valve assembly 18.

Moreover, to the extent that valve assembly 18 may need to be removed from joint 20 to repair or replace a component thereof, valve assembly 18 can easily be opened due to the connection between valve housing 40 and valve body 42. That is, due to valve housing 40 having at least one window 102 and valve body 42 having at least one prong 104, valve housing 40 can easily be disengaged from valve body 42 to replace or repair interior features of the valve assembly 18. As noted above, this may be accomplished by compressing prongs 104 inward (i.e., toward second axially extending bore 58) by using a person's fingers (if valve body 42 and prongs 104 are formed of a polymeric material) or by using a tool if valve body 42 and prongs 104 are formed of a more rigid material such as a metal material. When reassembling valve assembly 18, it should be noted that the connection between window 102 and prong 104 may also be used by the installer of valve assembly 18 to indicate that a sufficiently rigid connection between valve housing 40 and valve body 42 has been established.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve assembly, comprising:
a valve housing including a first open end defining a valve inlet, and a second open end;
a valve body having a proximate open end configured to be mated with the second open end and defining a valve seat, and a distal open end defining a valve outlet;
a movable plunger positioned within the valve housing, the movable plunger defining a valve member that is configured to engage with the valve seat when the valve assembly is closed and be located away from the valve seat when the valve assembly is open; and
a spring positioned between the movable plunger and the valve body, the spring being configured to bias the movable plunger toward the valve inlet,
wherein the second open end of the valve housing includes at least one window that extends through a wall of the valve housing;
the proximate open end of the valve body includes at least one prong that is configured to mate with the at least one window when the proximate open end is mated with the second open end of the valve housing; and
wherein the valve body has an intermediate section containing the at least one prong and also tapers radially inwardly, and wherein the valve housing has a section that contains the at least one window and also receives the intermediate section of the valve body when the at least one prong is mated with the at least one window.

2. The valve assembly according to claim 1, wherein the valve body defines a bore, and the at least one prong is wing-shaped and includes a sloped surface that extends away from the bore and terminates at a surface that extends axially and in parallel with the bore, and the surface that extends axially and in parallel with the bore terminates at an abutment surface of the at least one prong that extends orthogonally inward toward the bore.

3. The valve assembly according to claim 1, wherein an exterior surface of the valve body defines a plurality of ridges configured for receipt of an annular sealing member.

4. The valve assembly according to claim 3, wherein a support structure is provided between adjacent ridges.

5. The valve assembly according to claim 1, wherein the first open end of the valve housing includes a radially inwardly extending shoulder that defines a surface that is configured to support the plunger when the valve assembly is open.

6. The valve assembly according to claim 5, wherein the plunger includes a body having a conically-shaped first section and a conically-shaped second section, and the valve member has a portion that extends radially outward from the body at a location between the first section and the second section.

7. The valve assembly according to claim 6, wherein the plunger includes plurality of spaced apart radially outwardly extending fins that extend outward from the second section of the body.

8. The valve assembly according to claim 7, wherein each of the fins includes a first terminal end attached to the body at a location proximate the valve member and a second terminal end that is configured to seat against the surface of the valve housing.

9. The valve assembly according to claim 8, wherein a notch is located between the first terminal end and the second terminal end that is configured as a first spring seat for a first end of the spring.

10. The valve assembly according to claim 9, wherein the valve body at the open proximate end includes an annular shoulder that extends outward from the open proximate end at a location downstream from the valve seat that defines a second spring seat for a second end of the spring.

11. A valve assembly, comprising:
a cylindrical valve housing including a first open end defining a valve inlet and a second open end, the cylindrical valve housing defining a first bore;
a cylindrical valve body having a proximate open end configured to be mated with the second open end and defining a valve seat, and a distal open end defining a valve outlet, the cylindrical valve body defining a second bore having a diameter that is less than the first bore;
a movable plunger positioned within the valve housing, the movable plunger defining a valve member that is configured to engage with the valve seat when the valve assembly is closed and be located away from the valve seat when the valve assembly is open; and
a spring positioned between the movable plunger and the valve body, the spring being configured to bias the movable plunger toward the valve inlet,
wherein the second open end of the valve housing includes at least one window that extends through a wall of the valve housing;
the proximate open end of the valve body includes at least one prong that is configured to mate with the at least one window when the proximate open end is mated with the second open end of the valve housing; and
wherein the first open end of the valve housing includes a radially inwardly extending shoulder that defines a surface that is configured to support the plunger when the valve assembly is open.

12. The valve assembly according to claim 11, wherein the at least one prong is wing-shaped and includes a sloped surface that extends away from the second bore and terminates at a surface that extends axially and in parallel with the second bore, and the surface that extends axially and in parallel with the second bore terminates at an abutment surface of the at least one prong that extends orthogonally inward toward the second bore.

13. The valve assembly according to claim 11, wherein an exterior surface of the valve body defines a plurality of ridges configured for receipt of an annular sealing member.

14. The valve assembly according to claim 13, wherein a support structure is provided between adjacent ridges.

15. The valve assembly according to claim 11, wherein the plunger includes a body having a conically-shaped first section and a conically-shaped second section, and the valve member has a portion that extends radially outward from the body at a location between the first section and the second section.

16. The valve assembly according to claim 15, wherein the plunger includes a plurality of spaced apart radially outwardly extending fins that extend outward from the second section of the body.

17. The valve assembly according to claim 16, wherein each of the fins includes a first terminal end attached to the body at a location proximate the valve member and a second terminal end that is configured to seat against the surface of the valve housing.

18. The valve assembly according to claim 17, wherein a notch is located between the first terminal end and the second terminal end that is configured as a first spring seat for a first end of the spring.

19. The valve assembly according to claim 18, wherein the valve body at the open proximate end includes an annular shoulder that extends outward from the open proximate end at a location downstream from the valve seat that defines a second spring seat for a second end of the spring.

20. The valve assembly according to claim 11 wherein the valve body has an intermediate section containing the at least one prong and also tapers radially inwardly, and wherein the valve housing has a section that contains the at least one window and also receives the intermediate section of the valve body when the at least one prong is mated with the at least one window.

\* \* \* \* \*